United States Patent
Bucher et al.

(10) Patent No.: US 10,774,689 B2
(45) Date of Patent: Sep. 15, 2020

(54) HEAT RECOVERY DEVICE AND METHOD

(71) Applicant: Mahle International GmbH, Stuttgart (DE)

(72) Inventors: Michael Bucher, Berlin (DE); Maria Metinger, Berlin (DE)

(73) Assignee: Mahle International GmbH (DE)

(*) Notice: Subject to any disclaimer, the term of this patent is extended or adjusted under 35 U.S.C. 154(b) by 92 days.

(21) Appl. No.: 15/818,706

(22) Filed: Nov. 20, 2017

(65) Prior Publication Data

US 2018/0142578 A1 May 24, 2018

(30) Foreign Application Priority Data

Nov. 21, 2016 (DE) .................. 10 2016 222 927

(51) Int. Cl.
*F01K 13/00* (2006.01)
*F01K 9/02* (2006.01)
(Continued)

(52) U.S. Cl.
CPC ............ *F01K 13/006* (2013.01); *F01K 9/02* (2013.01); *F01K 13/02* (2013.01); *F02G 5/02* (2013.01); *F22D 7/12* (2013.01); *Y02T 10/166* (2013.01)

(58) Field of Classification Search
CPC .......... F01K 9/02; F01K 13/00; F01K 13/006; F01K 23/065; F01K 23/10; F01K 23/101;
(Continued)

(56) References Cited

U.S. PATENT DOCUMENTS 4,120,172 A * 10/1978 Pierce ...................... F25B 1/00
165/104.31
4,341,202 A * 7/1982 French ................ F24D 17/0021
126/584
(Continued)

FOREIGN PATENT DOCUMENTS

DE 102008046853 A1 4/2009
DE 102011122436 A1 * 6/2013 ............. F01K 23/10
(Continued)

OTHER PUBLICATIONS

English abstract for DE-102013211875.

*Primary Examiner* — Mark A Laurenzi
*Assistant Examiner* — Xiaoting Hu
(74) *Attorney, Agent, or Firm* — Fishman Stewart PLLC

(57) ABSTRACT

A heat recovery device may include a circuit. During operation of the heat recovery device, a working medium may circulate. The circuit may include a conveyor to convey the working medium. An evaporator may be arranged downstream of the conveyor and may evaporate the working medium. An expander may be arranged downstream of the evaporator and may expand the working medium. The expander may have a shaft that may pick up a torque at the expander. A condenser may be arranged downstream of the expander and may condense the working medium. A tank may be connected to the circuit. The tank may define a volume for the working medium. An adjustor may change the volume of the tank for the working medium. A non-return valve may be arranged between the tank and the condenser, and may prevent a flow of the working medium in a direction of the condenser.

20 Claims, 1 Drawing Sheet

(51) Int. Cl.
*F01K 13/02* (2006.01)
*F22D 7/12* (2006.01)
*F02G 5/02* (2006.01)

(58) Field of Classification Search
CPC .......... F01K 13/02; F02G 5/02; F22B 1/1807; Y02T 10/166; F22D 7/00; F22D 7/12; F22D 7/14
See application file for complete search history.

(56) References Cited

U.S. PATENT DOCUMENTS

| | | | |
|---|---|---|---|
| 7,950,230 B2 | 5/2011 | Nishikawa et al. | |
| 8,141,362 B2* | 3/2012 | Benstead | F28D 15/0266 60/655 |
| 2003/0126912 A1* | 7/2003 | Cook | A61H 9/0078 73/49.2 |
| 2007/0044473 A1* | 3/2007 | Yatsuzuka | F01K 13/006 60/670 |
| 2011/0265476 A1* | 11/2011 | Berger | F01K 13/02 60/651 |
| 2013/0199173 A1* | 8/2013 | Voss | F01K 27/00 60/530 |
| 2013/0327041 A1* | 12/2013 | Gaertner | F01K 13/02 60/615 |
| 2014/0150426 A1* | 6/2014 | Rewers | F01K 23/065 60/605.1 |
| 2015/0013338 A1* | 1/2015 | Smague | F01N 5/02 60/645 |
| 2015/0135708 A1* | 5/2015 | Lutz | F01K 13/02 60/618 |
| 2015/0275778 A1* | 10/2015 | Fast | F22B 1/1807 123/48 R |
| 2015/0300210 A1* | 10/2015 | Smague | F01K 9/023 60/645 |
| 2016/0061055 A1* | 3/2016 | Bowan | F01K 7/06 290/40 B |
| 2016/0326981 A1* | 11/2016 | Kolb | H02K 7/1823 |
| 2017/0016356 A1* | 1/2017 | Seo | F01K 23/101 |
| 2017/0254223 A1* | 9/2017 | Goethals | F01K 25/08 |

FOREIGN PATENT DOCUMENTS

| | | | |
|---|---|---|---|
| DE | 102013211875 A1 | 1/2015 | |
| WO | WO-2011092705 A2 * | 8/2011 | ............ F01K 25/10 |

* cited by examiner

HEAT RECOVERY DEVICE AND METHOD

CROSS-REFERENCE TO RELATED APPLICATION

This application claims priority to DE 10 2016 222 927.3 filed on Nov. 21, 2016, the contents of which are hereby incorporated by reference in their entirety.

TECHNICAL FIELD

The present invention relates to a heat recovery means with a circuit, in which a working medium circulates, according to the independent claims. The invention furthermore relates to a method for operating such a heat recovery means.

BACKGROUND

A heat recovery means serves for the recovery of energy from heat or respectively from waste heat. This waste heat can originate for example from an internal combustion engine, in particular from the exhaust gas of an internal combustion engine. Usually, the heat recovery means has a circuit for the recovery of the energy, in which a working medium circulates and in which there are arranged in succession a conveying means for conveying the working medium, an evaporator for evaporating the working medium, an expander for expanding the working medium and a condenser for condensing the working medium. The conveying means therefore conveys the working medium in the circuit, which is evaporated in the evaporator via the waste heat for example of the exhaust gas, and therefore receives energy which is converted in the expander. The thermal energy which is received via the evaporator is therefore converted in the expander into a mechanical energy which can be picked up in the form of a torque at the expander.

Different modes are present during operation of the heat recovery means. Between the different modes, in particular different thermodynamic states are present, which differ in particular through different aggregate states of the working medium in the circuit. On starting of the heat recovery means, for example a start-up operation prevails, whereas on or respectively after switching off the heat recovery means, a shutdown operation prevails.

For an independent operating of the heat recovery means, it is basically conceivable to separately drive the conveying means for conveying the working medium. In this case, the conveying means can be present as an independently driven pump. Accordingly, the conveying means can be adapted to the respective operation of the heat recovery means, in particular the start-up operation and the shutdown operation can be regulated in a simplified manner. The use of such an independent conveying means, however, has the disadvantage that the overall energy efficiency of the heat recovery means is reduced.

To improve the overall energy efficiency of the heat recovery means, it is conceivable to connect the conveying means with the expander in such a way that the conveying means is driven by the expander. This indeed leads to said improvement in the energy efficiency. As the expander does not make available a sufficient torque for driving the conveying means, in particular in the start-up and/or shutdown operation, a sufficient adaptation of the conveying means can not be undertaken in these operating modes. To solve this problem, it is conceivable to use in the circuit a, usually electrically driven, auxiliary conveying means, which supports the conveying means or replaces it in particular operating modes. The use of the auxiliary conveying means leads, however, to a reduction in the overall energy efficiency of the heat recovery means. Furthermore, additional components are necessary, which increase the production costs and the installation expenditure of the heat recovery means.

The present invention is therefore concerned with the problem of indicating for a heat recovery means of the type named in the introduction, and for methods for operating such a heat recovery means, improved or at least alternative embodiments, which are distinguished in particular by an increased energy efficiency and/or a reduced installation expenditure.

This problem is solved according to the invention by the subjects of the independent claims. Advantageous embodiments are the subject of the dependent claims.

SUMMARY

The present invention is based on the general idea of arranging in a circuit of a heat recovery means a tank for storing a working medium circulating in the circuit during operation, wherein a volume of the tank for storing the working medium is changeable. By changing the volume of the tank, which is originally provided for storing the working medium, the working medium can be driven in the circuit and can therefore be conveyed. The tank with the changeable volume comes into use here, in addition to a conveying means, for conveying the working medium, and can be alternatively used in order to drive the working medium in the circuit if required. Consequently, additional auxiliary conveying means for conveying the working medium in the circuit can be dispensed with, so that the overall energy efficiency of the heat recovery means is improved. As the tank is a conventional component in heat recovery means, therefore in addition the installation expenditure for the production of the heat recovery means, and the manufacturing costs, are reduced. In accordance with the idea of the invention, the heat recovery means has the circuit in which during operation of the heat recovery means the working medium circulates. In the circuit of the heat recovery means, the conveying means, an evaporator, an expander and a condenser are arranged here in succession. This means that the heat recovery means has the conveying means for conveying the working medium, which is arranged upstream of the evaporator for evaporating the working medium. Downstream of the evaporator, the expander is arranged for expanding the working medium, whereas downstream of the expander and upstream of the conveying means the condenser is arranged for condensing the working medium. The expander has here a shaft at which a torque can be picked up. Therefore, it is possible to obtain mechanical energy in the heat recovery means from heat or respectively waste heat, which is fed to the evaporator, and to pick it up at the shaft. According to the invention, between the condenser and the conveying means, the tank is connected to the circuit, in particular is arranged in the circuit. The tank has here the volume for the working medium, which is able to be changed by means of an adjusting means. This means that the adjusting means changes the volume of the tank for the working medium. In addition, between the tank and the condenser a non-return valve is arranged, which prevents a flow of the working medium in the direction of the condenser. This means that the non-return valve makes provision that working medium which flows through the circuit, in particular is driven by the changing of the volume of the tank, flows out from the tank in the direction of the evaporator and not in the direction of the condenser.

It is preferred if the conveying means is drivingly connected to the expander in such a way that the expander can drive the conveying means and drives during operation.

Alternatively or additionally, the conveying means can be drivingly connected to an internal combustion engine for driving the conveying means. Here, exhaust gas of this internal combustion engine can be fed for the supply of heat to the evaporator.

The changing of the volume of the tank by means of the adjusting means, in particular a reducing of the volume of the tank, leads to working medium which is stored in the volume being displaced from the volume and arriving into the circuit. Owing to the non-return valve, working medium is therefore driven in the direction of the evaporator. By a repeated enlarging, in which working medium flows into the tank, and reducing of the volume, it is possible to repeat this process and to drive working medium repeatedly in the circuit. This drive of the working medium can be used in particular in order to support the conveying means. Preferably, the conveying of the working medium comes into use through the changing of the volume of the tank when the conveying means, driven by the expander, makes possible no or at last no sufficient conveying of the working medium in the circuit.

Embodiments are preferred, in which the adjusting means has a membrane arranged in the tank, which membrane is provided displaceably in the tank. By a displacing of the membrane in the tank, the volume for the working medium is altered here. It is particularly preferred if the displacing of the membrane in the tank takes place by means of a compressed air means. This means that the compressed air means acts on the membrane by means of compressed air, in order to displace the membrane accordingly and to alter the volume in the tank. This enables a particularly simple and/or favourably priced implementation of the adjusting means and a simple altering of the volume of the tank.

Basically, the membrane can be displaced axially or radially in the tank for altering the volume of the tank.

In preferred configurations, the membrane is constructed as an inflatable bag which has a bag volume which is adjustable by the compressed air means. The membrane, constructed as a bag, is therefore arranged in the volume of the tank, wherein an enlargement of the bag volume leads to a reduction of the volume of the tank for the working medium, whereas a reducing of the bag volume leads to an enlargement of the volume of the tank for the working medium. Accordingly, by an inflating of the bag or respectively draining off of compressed air from the bag, a corresponding change in the volume of the tank for the working medium can be achieved. Therefore, a particularly simple and efficient type of change of the volume of the tank for the working medium is achieved. The displacing of the membrane can therefore take place in particular between an inflated and a less inflated state of the bag.

It is preferred if the circuit between the tank and the evaporator is configured to be able to be flowed through only in the direction of the evaporator. For this, the conveying means can be configured in such a way that it only permits a flow of the working medium in the direction of the evaporator. In particular, the conveying means can block the flow of the working medium in the other direction. Alternatively or additionally, in the circuit between the tank and the evaporator a non-return valve can be provided, which permits the flow of the working medium in the direction of the evaporator and blocks it in the opposite direction.

According to advantageous embodiments, the heat recovery means has a conveying means bypass, which bypasses the conveying means. This means that the conveying means bypass can branch off from the circuit upstream of the conveying means and can open into the circuit downstream of the conveying means. Advantageously, a non-return valve, hereinafter also designated bypass non-return valve, is arranged on the conveying means bypass in such a manner that it prevents a flow of the working medium through the conveying means bypass in the direction of the tank. Hereby, it is therefore prevented in particular that working medium bypasses the conveying means via the conveying means bypass and can flow in the direction of the tank or respectively of the condenser.

Embodiments are advantageous, in which the heat recovery means has an expander bypass, bypassing the expander. The expander bypass can therefore branch off from the circuit upstream of the expander and can open into the circuit downstream of the expander. It is advantageous if, in addition, a control valve is provided, which adjusts the flow of the working medium through the expander bypass. Such a control valve can be arranged here in particular in the expander bypass.

As described above, the change in the volume of the tank for the working medium comes into use to support the conveying means and/or if the conveying means does not guarantee a sufficient conveying of the working medium.

Accordingly, a method in which the volume of the tank is used for driving the working medium in the circuit, also belongs to the object of this invention.

In a first variant of the method, such a change to the volume of the tank takes place in a start-up operation of the heat recovery means. In the start-up operation, the heat recovery means is put into operation, in particular after a lengthy standstill. Typically, the working medium is present substantially in liquid form during the start-up operation in the entire circuit. In the start-up operation, heat is fed to the evaporator, so that the working medium situated in the evaporator begins to evaporate. The evaporating of the working medium in the evaporator leads to the displacing of the working medium, arranged on the downstream side, in the direction of the tank, so that working medium, in particular liquid working medium, flows into the tank, in particular in a non-pressurized manner. Subsequently, the volume of the tank is reduced, when the working medium in liquid state has flowed into the tank. The reducing of the volume of the tank for the working medium, in particular by means of the compressed air means, for example by the increasing of the air pressure exerted by the compressed air means, leads to the working medium being driven in the direction of the evaporator and being further evaporated there. Preferably, the volume is subsequently enlarged again, in particular by the air pressure exerted by means of the compressed air means being reduced, in order to permit the inflow into the tank of the working medium flowing upstream of the tank.

The reducing and enlarging of the volume of the tank can be repeated, in order to achieve a repeated driving of the working medium in the direction of the evaporator. In this case, the tank is therefore, in particular in interaction with the non-return valves, also used as a pump. When the adjusting means has such a membrane, as a whole a type of membrane pump is therefore present.

The start-up operation of the heat recovery means, in particular the reducing and the enlarging of the volume of the tank for the working medium, is advantageously maintained until a normal operation of the heat recovery means is present, in which the conveying means conveys the working medium sufficiently in the circuit. In addition, in normal operation, the working medium preferably lies between the condenser and the evaporator upstream of the evaporator on the one hand and downstream of the evaporator on the other hand, in different aggregate states. In particular, the working medium is liquid between the condenser and the evaporator upstream of the evaporator, whereas it is gaseous or respectively evaporated between the evaporator and the condenser downstream of the evaporator.

In preferred embodiments, the reduction of the volume of the tank during flowing of the liquid working medium into the tank takes place in a time- and/or temperature-dependent and/or pressure-dependent manner. This means that the reduction of the volume takes place after a predetermined time, in particular after a predetermined time starting from the putting into operation of the heat recovery means, and/or on reaching of a predetermined temperature in the working medium and/or of a predetermined pressure in the working medium and/or of a predetermined pressure difference within the circuit in the working medium.

In a second variant of the method, which can be present alternatively or additionally to the first variant, in a shutdown operation of the heat recovery means, which is present after the switching off of the heat recovery means, in particular after the adjusting of the heat supply to the evaporator, the pressure in the working medium is reduced at the expander. Here, advantageously, the working medium is directed past the expander, in particular by means of the expander bypass and the control valve. This means that in the shutdown operation, the working medium is at least partially directed past the expander, in such a way that the pressure in the working medium decreases at the expander, and working medium flows out from the tank in the direction of the evaporator, in particular when the pressure in the working medium within the tank is greater than outside the tank, for example when the compressed air means is operated accordingly. The decrease in the pressure in the working medium at the expander leads here to the pressure in the working medium decreasing on the downstream side of the tank. The flowing of the working medium out from the tank leads as a whole to a pressure equalization in the working medium in the entire circuit, wherein this pressure equalization preferably takes place until the pressure in the working medium in the whole circuit is homogeneous or respectively equalized. As soon as this is achieved, or even earlier, through a corresponding actuation of the adjusting means, in particular of the compressed air means, by changes to the volume of the tank, a conveying of working medium out from the tank into the circuit can be brought about. This takes place preferably when the working medium between the evaporator and the condenser is compressible, in particular gaseous. In addition, this preferably takes place when the pressure in the working medium between the evaporator and the condenser is less than the pressure in the working medium in the tank. This takes place in particular until the working medium in the entire circuit is present in the same phase, preferably liquid.

It is conceivable here to additionally alter the volume of the tank, in order to achieve a corresponding equalization of the pressure in the working medium in the circuit. This is preferably achieved by an enlargement of the volume for the working medium. However, it is also conceivable that the volume is reduced, depending on pressure conditions in the working medium.

An alternatively or additionally present variant of the method makes provision that in the normal operation of the heat recovery means, in which the conveying means conveys the working medium sufficiently in the circuit, and/or the working medium is present in the circuit in two phases, and/or heat is supplied to evaporator, the volume of the tank is altered and adapted in such a way that at an inlet of the conveying means a predetermined pressure of the working medium is present. Therefore, in particular, the efficiency of the heat recovery means can be improved. The predetermined pressure is preferably selected such that the working medium at the inlet of the conveying means is undercooled in accordance with the requirements of the conveying means, in particular to prevent cavitation.

It is pointed out again that any desired combinations of the variants of the method also belong to the scope of this invention.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
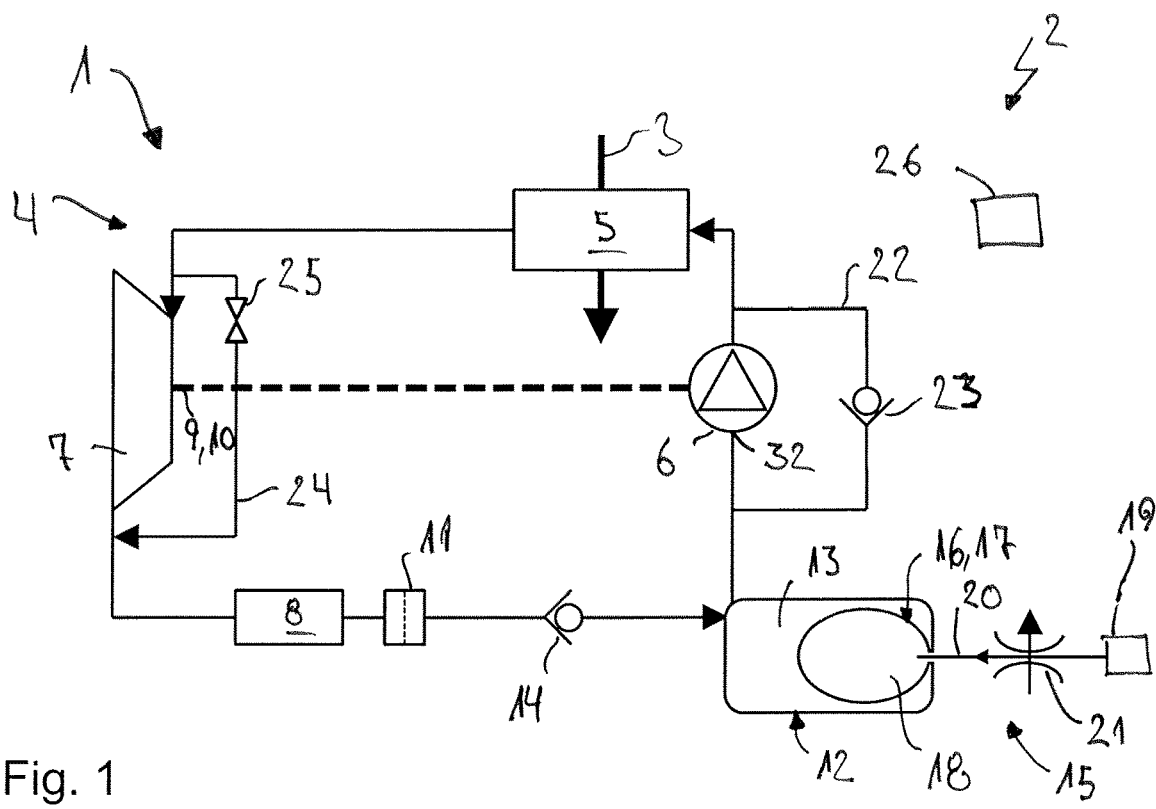
FIG. 1 a greatly simplified illustration, in the manner of a circuit diagram, of a heat recovery means, FIG. 2 a flow diagram to explain a method for operating the heat recovery means.

In FIG. 1 a heat recovery means 1 is illustrated in greatly simplified form and in the manner of a circuit diagram. The heat recovery means 1 can be a component of a motor vehicle 2, which is otherwise not shown, in order to recover energy from waste heat of the motor vehicle 2, for example from exhaust gas 3 of an internal combustion engine which is not shown. The heat recovery means 1 has a circuit 4 in which, during operation, a working medium circulates. The heat transmission to the heat recovery means 1, in particular by means of the exhaust gas 3, takes place via an evaporator 5, which is arranged in the circuit 4. The evaporator 5 serves for the evaporating of the working medium by means of the heat supplied in particular via the exhaust gas 3. The working medium is conveyed here by a conveying means 6, which is arranged in the circuit 4 upstream of the evaporator 5. Downstream of the evaporator 5, an expander 7 is arranged for expanding the working medium, wherein downstream of the expander 7 a condenser 8 is arranged for condensing the working medium. The expander 7 has a shaft 9, with which at the expander 7 a torque can be picked up and therefore thermal energy can be recovered. In the present case, the shaft 9 is used for driving the conveying means 6 and is therefore configured as a drive shaft 10. Downstream of the condenser 8 in the circuit 4 a filter 11 is arranged for filtering the working medium.

Between the condenser 8 and the conveying means 6, in the present case between the filter 11 and the conveying means 6, a tank 12 is fluidically connected to the circuit 4, which tank serves primarily for the storing of working medium. For this, the tank 12 has a volume 13 for the working medium, which is fluidically connected or connectable to the circuit 4 between the conveying means 6 and the condenser 8 or respectively the filter 11. Here, between the tank 12 and the condenser 8, in the present case between the tank 12 and the filter 11, a non-return valve 14, hereinafter designated condenser non-return valve 14, is arranged. The condenser non-return valve 14 prevents working medium from flowing contrary to the flow direction of the working medium, predetermined by the conveying means 6, in the direction of the condenser 8 or respectively of the filter 11. This means that the condenser non-return valve 14 prevents the working medium from flowing out from the tank 12 directly in the direction of the condenser 8. The heat recovery means 1 has, in addition, an adjusting means 15, by which the volume 13 of the tank 12 for the working medium is altered. The adjusting means 15 has in the present case a membrane 16, which is arranged in the tank 12 and is constructed as an inflatable bag 17, which has a bag volume 18. The bag 17 arranged within the volume 13 of the tank 12 can therefore lead, via a change of the bag volume 18, to a corresponding change of the volume 13 of the tank 12 for the working medium. For displacing the membrane 16, in the present case for changing the bag volume 18, the adjusting means 15 has a compressed air means 19, by which the membrane 16, constructed as bag 17, can be inflated or respectively air can be drained out from the bag 17. The compressed air means 19 is fluidically connected to the bag volume 18 by means of a compressed air line 20, wherein in the compressed air line 20 a compressed air control valve 21 is provided for controlling the compressed air, in particular also for draining compressed air out from the bag volume 18. The compressed air control valve 21 can be a component of the compressed air means 19.

The heat recovery means 1 has in addition a conveying means bypass 22 for bypassing the conveying means 6, which branches off from the circuit 4 upstream of the conveying means 6 and downstream of the tank 12 and opens into the circuit 4 downstream of the conveying means 6 and upstream of the evaporator 5. In the conveying means bypass 22 a non-return valve 23, designated hereinafter as conveying means non-return valve 23, is arranged, which prevents a flow of the working medium through the conveying means bypass 22 in the direction of the tank 12. The heat recovery means 1 has, in addition, an expander bypass 24 for bypassing the expander 7, which branches off from the circuit 4 upstream of the expander 7 and downstream of the evaporator 5, and opens into the circuit 4 downstream of the expander 7 and upstream of the condenser 8. In the expander bypass 24 a control valve 25, designated hereinafter as expander control valve 25, is arranged, which serves for the adjusting of the flow of the working medium through the expander bypass 24. The adjusting means 15, in particular the compressed air means 19 and the compressed air control valve 21, and the expander control valve 25, are connected to a control means 26 such that they can be controlled by the control means 26. The control means 26 here can be a component of the heat recovery means 1 or of the motor vehicle 2.

Figure 2:
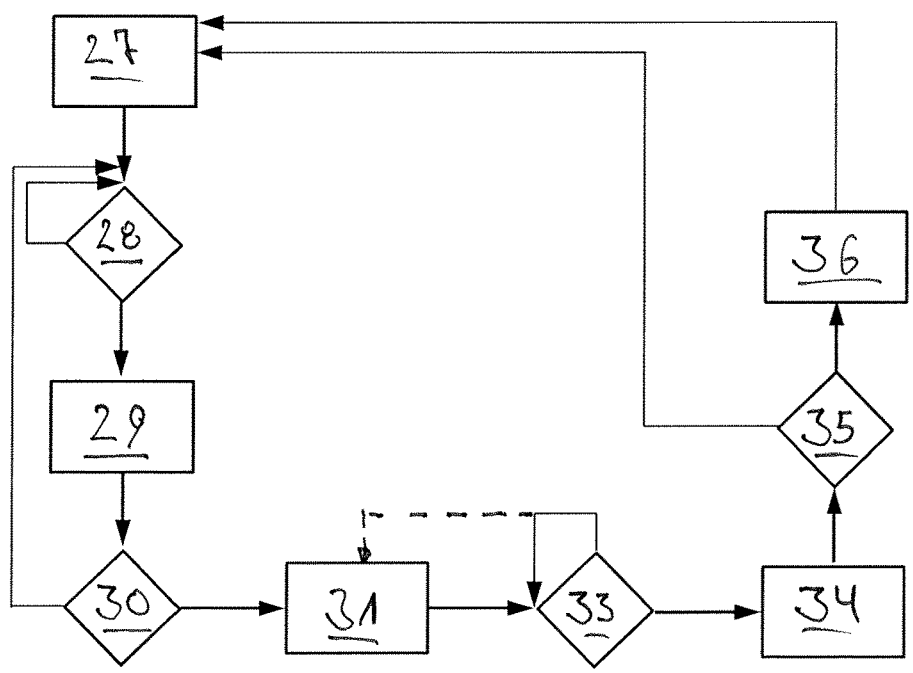

A method for operating the heat recovery means 1 is explained below with the aid of the flow diagram shown in FIG. 2, wherein the control means 26 can be configured in such a way that it carries out the method.

In a first method step 27, a start or respectively a putting into operation of the heat recovery means 1 takes place. The putting into operation or respectively the start leads to a start-up operation of the heat recovery means 1, in which the working medium is present in the heat recovery means 1 in an aggregate state, in particular liquid. In this operation, a certain quantity of working medium, for example one litre of working medium, is stored in the volume 13 of the tank 12. The start-up operation is also characterized in that heat is supplied to the evaporator 5 after a lengthy period of time, in particular after a standstill of the heat recovery means 1. As a result of the supply of heat, an evaporation takes place of working medium situated in the evaporator 5. Hereby, working medium is displaced downstream of the evaporator 5 and leads to a non-pressurized flow of the working medium into the volume 13 of the tank 12. In a second method step 28, a check is carried out as to whether in the start-up operation working medium flows into the volume 13 of the tank 12. If no such flow is present, or the flow is not sufficient, a check is carried out again as to whether the flow is present. In so far as such a flow is present and sufficient, in a third method step 29 the volume 13 of the tank 12 is reduced by means of the adjusting means 15. The reduction of the volume 13 of the tank 12 takes place here after a predetermined time starting from the putting into operation of the heat recovery means 1 and/or on reaching of a predetermined temperature of the working medium, in particular in the tank 12. The reducing of the volume 13 of the tank 12 leads to liquid working medium flowing in the direction of the evaporator 5, wherein the condenser non-return valve 14 prevents this working medium from flowing in the direction of the condenser 8. Therefore, the evaporator 5 can continue to evaporate working medium. This step can be repeated, the volume 13 of the tank 12 can therefore be subsequently enlarged and reduced again, until sufficient torque can be picked up at the expander 7 in order to drive the conveying means 6 sufficiently and therefore to ensure a sufficient conveying of the working medium in the circuit 4. Accordingly, in a fourth method step 30, a check is carried out as to whether such a state exists, hereinafter designated as normal operation. In the fourth method step 30, a check is therefore carried out as to whether the conveying means 6 conveys the working medium sufficiently in the circuit 4. Alternatively or additionally, a check can be carried out as to whether the working medium is present in the circuit 4 in different aggregate states, in particular gaseous or respectively evaporated between the evaporator 5 and the condenser 8, and liquid between the condenser 8 and the evaporator 5. In so far as the normal operation is not reached, in particular the conveying means 6 does not guarantee a sufficient conveying of the working medium, the method returns to the second method step 28. In so far as normal operation is present, in a fifth method step 31 an adapting of the volume 13 of the tank 12 takes place in such a way that at an inlet 32 (see FIG. 1) for letting the working medium into the conveying means 6, a predetermined pressure of the working medium is present. In particular, the volume 13 is adapted in such a way that at the inlet 32 a sufficient undercooling of the working medium is present.

On switching off the heat recovery means 1, in particular on shutting off the heat supply to the evaporator 5, a shutdown operation of the heat recovery means 1 is present. Here, in a sixth method step 33, a check is carried out as to whether such a shutdown operation is present. If no such shutdown operation is present, the method returns to the method step 31. Alternatively, the method can check in loops as to whether the shutdown operation is present. In so far as the shutdown operation is present, in a seventh method step 34 the working medium is directed past the expander 7 via the expander bypass 24. Therefore, no drive of the conveying means 6 takes place and the pressure in the working medium is reduced. In the shutdown operation, in the volume 13 of the tank 12 initially preferable a greater quantity of the working medium is stored than at the start of the start-up operation. The decrease of the pressure in the working medium in the circuit 4 by the directing of the working medium past the expander 7 leads here to working medium, in particular liquid working medium, flowing out from the volume 13 of the tank 12 and therefore arriving at the evaporator 5, in particular when the pressure in the bag volume 18 is greater than in the volume 13 of the tank 12.

In an eighth method step 35, a check is carried out here as to whether the working medium is present in the same aggregate state, in particular liquid, in the entire circuit 4 through the action carried out in method step 34. In so far as this is the case, the method returns to the first method step 27. If the actions carried out in the seventh method step 34 for achieving a homogeneous pressure in the working medium in the entire circuit 4 are not sufficient and/or if this is not the case after a predetermined time, and/or additionally, in a ninth method step 36 the volume 13 of the tank 12 can be adapted such that the working medium is present in the circuit 4 in the same aggregate state, in particular liquid. The actions carried out in the seventh method step 34 and/or ninth method step 36 take place preferably until the working medium no longer flows in the circuit 4, i.e. until there is no circulation of the working medium in the circuit 4.

The invention claimed is:

1. A heat recovery device comprising:
a circuit, wherein during operation of the heat recovery device a working medium circulates, wherein the circuit includes:
a pump fluidically connected to the circuit and configured to convey the working medium through the circuit;
an evaporator, arranged downstream of the pump, configured to evaporate the working medium;
an expander, arranged downstream of the evaporator, configured to expand the working medium, the expander having a shaft configured to pick up a torque at the expander;
a condenser, arranged downstream of the expander, configured to condense the working medium;
a tank connected to the circuit between the condenser and the pump, the tank defining a volume for the working medium;
an adjustor including a membrane disposed in the tank and a compressed air device fluidically connected to the membrane, the adjustor configured to change the volume of the tank for the working medium via displacing the membrane in the tank with compressed air from the compressed air device;
a non-return valve, arranged between the tank and the condenser, configured to prevent a flow of the working medium in a direction of the condenser; and
a controller operatively connected to the adjustor, the controller configured to alternatingly increase and decrease the volume of the tank for the working medium during a start-up operation via actuating the adjustor and displacing the membrane in the tank such that a supplemental flow of the working medium is conveyed through the circuit.

2. The heat recovery device according to claim 1, wherein the pump is drivingly connected to the expander.

3. The heat recovery device according to claim 1, wherein the compressed air device includes a compressed air line fluidically connected to the membrane such that compressed air acts on the membrane via the compressed air device.

4. The heat recovery device according to claim 3, wherein the membrane comprises an inflatable bag, the inflatable bag having a bag volume, the bag volume adjustable by the compressed air device.

5. The heat recovery device according to claim 3, wherein the membrane is configured to be displaced at least one of axially or radially in the tank.

6. The heat recovery device according to claim 3, further comprising a compressed air control valve disposed in the compressed air line, structured and arranged to drain compressed air from the membrane.

7. The heat recovery device according to claim 6, wherein:
the controller is operatively connected to the compressed air device and the compressed air control valve; and
the controller is further configured to alternatingly actuate the compressed air device and the compressed air control valve during the start-up operation such that the volume of the tank for the working medium increases and decreases in an alternating manner.

8. The heat recovery device according to claim 1, wherein the circuit between the tank and the evaporator is configured to flow only in a direction of the evaporator.

9. The heat recovery device according to claim 1, further comprising an expander bypass configured to bypass the expander, and a control valve configured to adjust the flow of the working medium through the expander bypass.

10. The heat recovery device according to claim 9, wherein:
the controller is operatively connected to the control valve; and
the controller is further configured to actuate the control valve during a shutdown operation such that the working medium is flowable through the expander bypass bypassing the expander.

11. The heat recovery device according to claim 1, further comprising:
a conveyor bypass that branches off from the circuit upstream of the pump and downstream of the tank and opens into the circuit downstream of the pump and upstream of the evaporator; and
a non-return valve disposed in the conveyor bypass configured to prevent a flow of the working medium through the pump in a direction of the tank.

12. The heat recovery device according to claim 1, further comprising a filter disposed downstream of the condenser configured to filter the working medium.

13. The heat recovery device according to claim 12, wherein the filter is disposed in the circuit between the condenser and the non-return valve upstream of the tank.

14. The heat recovery device according to claim 1, wherein the pump is structured and arranged to block a flow of the working medium in the circuit in a direction from the evaporator to the tank such that, between the evaporator and the tank, the working medium is flowable exclusively in a direction of the evaporator.

15. The heat recovery device according to claim 1, wherein the controller is further configured to adjust the volume of the tank for the working medium based on at least one of:
an amount of time elapsed from initiation of the start-up operation;
a temperature of the working medium in the tank;

a difference in a pressure of the working medium within different portions of the circuit; and a number of phases of the working medium present in the circuit.

16. The heat recovery device according to claim 1, wherein:
the tank and the adjustor collectively define a membrane pump configured to convey the supplemental flow of the working medium through the circuit; and
the controller is further configured to selectively actuate the membrane pump during a shutdown operation.

17. A method for operating a heat recovery device comprising:
providing the heat recovery device, the heat recovery device having a circuit, wherein during operation of the heat recovery device a working medium circulates; wherein the circuit includes: a pump fluidically connected to the circuit and configured to convey the working medium through the circuit; an evaporator, arranged downstream of the pump, configured to evaporate the working medium; an expander, arranged downstream of the evaporator, configured to expand the working medium, the expander having a shaft configured to pick up a torque at the expander; a condenser, arranged downstream of the expander, configured to condense the working medium; a tank connected to the circuit between the condenser and the pump, the tank defining a volume for the working medium; an adjustor including a membrane disposed in the tank and a compressed air device fluidically connected to the membrane, the adjustor configured to change the volume of the tank for the working medium via displacing the membrane in the tank with compressed air from the compressed air device; a non-return valve, arranged between the tank and the condenser, configured to prevent a flow of the working medium in a direction of the condenser; and a controller configured to adjust the volume of the tank via actuating the adjustor and displacing the membrane in the tank;
passing the working medium from the tank into the circuit via reducing the volume of the tank;
flowing the working medium from the circuit into the tank via enlarging the volume of the tank; and
repeatedly reducing the volume of the tank and enlarging the volume of the tank in an alternating manner via the controller during a start-up operation of the heat recovery device by actuating the adjustor and displacing the membrane in the tank such that a supplemental flow of the working medium is conveyed through the circuit, wherein the working medium is in a substantially liquid state in the circuit during the start-up operation.

18. The method according to claim 17, wherein repeatedly reducing the volume of the tank and enlarging the volume of the tank in an alternating manner via the controller during the start-up operation includes performing a first reduction of the volume of the tank after at least one of:
a predetermined amount of time has elapsed since putting the heat recovery device into operation;
reaching a predetermined temperature in the working medium;
reaching a predetermined pressure in the working medium; and
reaching a predetermined pressure difference in the working medium.

19. The method according to claim 17, further comprising:
starting a shutdown operation, via switching off the heat recovery device;
decreasing a pressure in the working medium at the expander during the shutdown operation via directing the working medium past the expander; and
flowing the working medium out from the tank in a direction of the evaporator during the shutdown operation via directing the working medium past the expander.

20. A heat recovery device comprising:
a circuit, wherein during operation of the heat recovery device a working medium circulates, wherein the circuit includes:
a pump fluidically connected to the circuit and configured to convey the working medium through the circuit;
an evaporator, arranged downstream of the pump, configured to evaporate the working medium;
an expander, arranged downstream of the evaporator, configured to expand the working medium, the expander having a shaft configured to pick up a torque at the expander, and wherein the pump is drivingly connected to the expander;
a condenser, arranged downstream of the expander, configured to condense the working medium;
a tank connected to the circuit between the condenser and the pump, the tank defining a volume for the working medium;
an adjustor including a membrane disposed in the tank and a compressed air device fluidically connected to the membrane, the adjustor configured to change the volume of the tank for the working medium via displacing the membrane in the tank with compressed air from the compressed air device;
an expander bypass fluidically connected to the circuit through which the working medium bypasses the expander, the expander bypass branching off from the circuit upstream of the expander and opening into the circuit downstream of the expander;
a control valve disposed in the expander bypass structured and arranged to adjust a flow of the working medium through the expander bypass;
a non-return valve, arranged between the tank and the condenser, configured to prevent a flow of the working medium in a direction of the condenser; and
a controller operatively connected to the adjustor, the controller configured to adjust the volume of the tank for the working medium via actuating the adjustor and displacing the membrane in the tank when the working medium in the circuit is present in two phases after a shut-down operation, until the working medium in the entire circuit is present in the same phase.

* * * * *